US010019838B2

(12) United States Patent
Liu et al.

(10) Patent No.: US 10,019,838 B2
(45) Date of Patent: Jul. 10, 2018

(54) HUMAN BODY THREE-DIMENSIONAL IMAGING METHOD AND SYSTEM

(71) Applicant: SHENZHEN UNIVERSITY, Shenzhen, Guangdong (CN)

(72) Inventors: Xiaoli Liu, Guangdong (CN); Dong He, Guangdong (CN); Xiang Peng, Guangdong (CN); Ameng Li, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 78 days.

(21) Appl. No.: 15/181,398

(22) Filed: Jun. 13, 2016

(65) Prior Publication Data
US 2016/0300383 A1 Oct. 13, 2016

Related U.S. Application Data

(63) Continuation of application No. PCT/CN2015/076869, filed on Apr. 17, 2015.

(30) Foreign Application Priority Data

Sep. 10, 2014 (CN) .......................... 2014 1 0458109

(51) Int. Cl.
*G06T 17/00* (2006.01)
*G06T 7/00* (2017.01)
(Continued)

(52) U.S. Cl.
CPC .............. *G06T 17/00* (2013.01); *G01B 11/00* (2013.01); *G06T 7/521* (2017.01); *G06T 7/55* (2017.01);
(Continued)

(58) Field of Classification Search
USPC .................................................. 345/419, 420
See application file for complete search history.

(56) References Cited

U.S. PATENT DOCUMENTS

| | | | | |
|---|---|---|---|---|
| 6,215,898 B1 * | 4/2001 | Woodfill | .................. | G06K 9/32 348/47 |
| 2009/0238449 A1 * | 9/2009 | Zhang | ................ | G01B 11/2536 382/165 |

(Continued)

FOREIGN PATENT DOCUMENTS

| | | |
|---|---|---|
| CN | 103267491 A | 8/2013 |
| CN | 103279762 A | 9/2013 |

OTHER PUBLICATIONS

Yongkai Yin, Calibration Technique for Phase-Aided Optical 3D Measurement Systems, Doctor of Philosophy Dissertation of Tianjin University, 2012.

(Continued)

*Primary Examiner* — Kimbinh T Nguyen

(57) ABSTRACT

The present invention relates to the technical field of three-dimensional imaging, and provides a human body three-dimensional imaging method and system, and a method for simultaneously calibrating multiple control base stations. According to the present invention, provided that the effective view fields of the various distributed sensors are subjected to no spatial overlap, the structural parameters and the global matching parameters of all the sensors are calibrated; a corresponding point search method utilizing phase shift in combination with the random structured light reduces image collection time for acquiring single view point depth data; by using the concept of time reuse, the overall data collection time is shortened, and meanwhile the design of distributed computation enhances the computing capability of the entire system; automatic matching of the depth data of (Continued)

different sensors is implemented according to the calibrated global matching parameters of the different sensors.

9 Claims, 8 Drawing Sheets

(51) Int. Cl.
  *G06T 15/04* (2011.01)
  *H04N 13/02* (2006.01)
  *G01B 11/00* (2006.01)
  *G06T 7/521* (2017.01)
  *G06T 7/80* (2017.01)
  *G06T 7/55* (2017.01)

(52) U.S. Cl.
  CPC ............. *G06T 7/80* (2017.01); *G06T 15/04* (2013.01); *H04N 13/0242* (2013.01); *G06T 2207/10028* (2013.01); *G06T 2207/30196* (2013.01); *G06T 2207/30244* (2013.01)

(56) References Cited

U.S. PATENT DOCUMENTS

| | | | | |
|---|---|---|---|---|
| 2010/0111370 A1* | 5/2010 | Black | ................ | G06K 9/00369 382/111 |
| 2010/0277571 A1* | 11/2010 | Xu | .......................... | G06T 17/00 348/47 |
| 2013/0195330 A1* | 8/2013 | Kim | ................... | G06K 9/00201 382/128 |
| 2013/0336550 A1* | 12/2013 | Kapur | ................ | G06K 9/00369 382/128 |
| 2016/0278678 A1* | 9/2016 | Valdes | ................ | A61B 5/14556 |
| 2016/0292533 A1* | 10/2016 | Uchiyama | ............... | G06T 7/593 |

OTHER PUBLICATIONS

Songde Ma and Zhengyou Zhang, Computer Vision, 1998, Science Press.
Xiaoli Liu, Key Techniques in Multiple Range Images Modeling, Doctor of Philosophy Dissertation of Tianjin University, 2008.
Jin Zhou et al., Fast 3D Human Body Reconstruction from Kinects, Journal of Computer-Aided Design & Computer Graphics, Jun. 2013, P873-879, vol. 25, No. 6.
Xingming Liu et al., Research of 3D Reconstruction Based on Computer Vision, Journal of Shenzhen Institute of Information Technology, Sep. 2013, P13-19, vol. 11, No. 3, China Academic Journal Electronic Publishing House.
Xiaoli Liu et al., 3D Auto-Inspection for Large Thin-Wall Object, Acta Optica Sinica, Mar. 2011, vol. 31, No. 3, China Academic Journal Electronic Publishing House.
International Search Report of PCT Patent Application No. PCT/CN2015/076869 dated Jul. 21, 2015.
1st Office Action of counterpart Chinese Patent Application No. 201410458109.X dated Aug. 21, 2015.
2nd Office Action of counterpart Chinese Patent Application No. 201410458109.X dated Mar. 18, 2016.

* cited by examiner

HUMAN BODY THREE-DIMENSIONAL IMAGING METHOD AND SYSTEM

CROSS-REFERENCE TO RELATED APPLICATIONS

The present application is a Continuation application of PCT application No. PCT/CN2015/076869 filed on Apr. 17, 2015, which claims the benefit of Chinese Patent Application No. 201410458109.X filed on Sep. 10, 2014, the contents of which are hereby incorporated by reference.

TECHNICAL FIELD

The present invention relates to the technical field of three-dimensional imaging, and in particular, relates to a human body three-dimensional imaging method and system based on distributed network control, and a method for simultaneously calibrating multiple base stations.

BACKGROUND

The phase-assisted three-dimensional imaging has such advantages as non-contact, high speed, high accuracy, high data density and the like, and has been widely used in the industrial production fields such as reverse engineering, quality control, defect detection and the like. In typical industrial applications, a single three-dimensional sensing system is employed to implement full-range three-dimensional imaging through a moving object or a sensing system. This process is generally hard to be automated, and long time is consumed. This solution is generally not applicable to human body three-dimensional imaging. In one aspect, a human body has large area, thus three-dimensional data needs to be acquired from multiple angles. In another aspect, using a human body as an example, it is difficult for the human body to remain stationary for a duration enough long for quick acquisition of the three-dimensional data. At present, available human body three-dimensional imaging systems mainly include: a laser-based handheld scanning system and a scanning system of a mechanically moving device. The handheld imaging system implements integral data collection through handheld movement at multiple angles, which generally needs several minutes. During this process, it is difficult for the human body to remain stationary. The imaging system based on mechanically moving device generally requires the human body to rotate or needs a large-size mechanical movement control device, which is large and bulky.

SUMMARY

A first technical problem to be solved by the present invention is to provide a human body three-dimensional imaging method so as to quickly and completely acquiring high-precision and high-density three-dimensional data of a human body, and color data of high sense of reality.

The present invention is implemented by a human body three-dimensional imaging method, which comprises the following steps:

step A: upon receipt of a collection instruction from a control center, a plurality of control base stations performing coding pattern projection for a human body, and meanwhile collecting human body image information observed from their respective view angles; and the control base stations performing depth computation for their respective human body image information to obtain three-dimensional geometric depth data in their respective local coordinate systems;

wherein the control base stations are interconnected, and are deployed surrounding the human body to form a measurement space completely covering the human body, each control base station comprises two longitudinally arranged three-dimensional sensors, wherein the two three-dimensional sensors are respectively configured to acquire three-dimensional geometric depth data and texture data of an upper part and a lower part of the human body from the view angle of the control base station;

step B: each of the control base stations transforming the three-dimensional geometric depth data from their respective local coordinate systems to a global coordinate system;

step C: each of the control base stations performing white light projection for the human body, collecting texture data of human body colors observed from their respective view angles, and sending the collected texture data together with the three-dimensional geometric depth data transformed in step B to the control center; and step D: the control center receiving the three-dimensional geometric depth data and corresponding surface texture data thereof in the global coordinate system which are transmitted by the control base stations, the control center firstly splicing the three-dimensional geometric depth data collected by the control base stations to obtain a human body three-dimensional model, and then removing redundancy for a human body integral model to obtain a fused human body three-dimensional model; afterwards, the control center performing a weighted operation for texture data of an overlapped portion of all human body colors that is collected by all the control base stations to obtain fused texture data; and finally the control center associating the fused human body three-dimensional model with the fused texture data in one-to-one style.

A second technical problem to be solved by the present invention is to provide a human body three-dimensional imaging system, which comprises:

a plurality of control base stations configured to: construct a human body measurement space, upon receipt of a collection instruction from a control center, perform coding pattern projection for a human body in a human body measurement space, and meanwhile collect human body image information observed from their respective view angles, and perform depth computation for their respective human body image information to obtain three-dimensional geometric depth data in their respective local coordinate systems; transform the three-dimensional geometric depth data from their respective local coordinate systems to a global coordinate system; perform white light projection for the human body, collect texture data of human body colors observed from their respective view angles, and send the collected texture data together with the transformed three-dimensional geometric depth data; wherein the control base stations are interconnected, and are deployed surrounding the human body to form a measurement space completely covering the human body, each control base station comprises two longitudinally arranged three-dimensional sensors, wherein the two three-dimensional sensors are respectively configured to acquire human body image information and texture data of an upper part and a lower part of the human body from the view angle of the control base station; and a control center configured to: receive the three-dimensional geometric depth data and corresponding surface texture data thereof in the global coordinate system that are transmitted by the control base stations, firstly splice the three-dimensional geometric depth data collected by the control base stations to obtain a human body three-dimensional model, and then remove redundancy for the human body integral model to obtain a fused human body three-dimensional model; afterwards, the control center performs a weighted operation for texture data of an overlapped portion of all human body colors that is collected by the control base stations to obtain fused texture data; and finally the control center associates the fused human body three-dimensional model with the fused texture data in a one-to-one style.

A third technical problem to be solved by the present invention is to provide a method for simultaneously calibrating multiple control base stations in the three-dimensional imaging system as described above, which comprises the following steps:

step A01: shooting a three-dimensional target from multiple different view angles by using a high-resolution digital camera to obtain target images; wherein the three-dimensional target is capable of covering the measurement space and is adhered with a plurality of coding mark points on the surface thereof, each mark point has a different coding strip as a unique identifier;

step A02: performing central positioning and decoding for the mark points in the target image, and acquiring a corresponding relationship between images from different view angles and image coordinates according to different coding values of the coding points;

Step A03: acquiring image coordinates $\hat{m}_{ij}(K,\theta,r_i,t_i;X_j)$ of the re-projection of the global coordinates $X_j$ of each of the different codes at a shooting view angle i by means of bundle adjustment, and optimizing the error of the re-projection, as represented by the following formula:

$$\min \text{cost}(K, \theta, X_j) = \sum_{i=1}^{N}\sum_{j=1}^{M}\left\{\left\|\hat{m}_{ij} - \hat{m}_{ij}(K, \theta, r_i, t_i, X_j)\right\|^2\right\}$$

wherein $(K,\theta)$ represents an internal structural parameter of the camera, $(r_i,t_i)$ represents a shooting gesture, and $\hat{m}_{ij}$ represents the coordinate of the circle center image; as such the global coordinates $X_j$ of different coding points are obtained and the target correct is implemented;

step A04: placing the corrected three-dimensional target into the measurement space, controlling the three-dimensional target to rotate for multiple times, and collecting an image of the three-dimensional target by the control base station upon each rotation; and with respect to a binocular node i, using a structural parameter of a binocular sensor and an external parameter of the node as parameter vectors to be optimized, and constructing an optimized target function as represented by the following formula:

$$\text{cost}(\tau_i) = \sum_{t=1}^{N}\sum_{s=1}^{M}\left\{\left\|\hat{m}_l^{st} - \hat{m}_l^{st}(K_l^i, \theta_l^i, r_s^i, t_s^i; X_w^t)\right\|^2 + \left\|\hat{m}_r^{st} - \hat{m}_r^{st}(K_r^i, \theta_r^i, r^i, t^i, r_s^i, t_s^i; X_w^t)\right\|^2\right\}$$

wherein the subscript s represents the s-th shooting gesture of the system, t represents the t-th mark point in the target, $X_w^t$ represents the coordinates of the t-th mark point in the global coordinate system, $\tau_i=\{K_l^i,\theta_l^i,K_r^i,\theta_r^i,r^i,t^i,r_s^i,t_s^i\}$ represents a to-be-optimized parameter vector of the sensor node i, $\{K_l^i,\theta_l^i\}$ and $\{K_r^i,\theta_r^i\}$ respectively represent an internal parameter and a distortion of the first and second cameras of the sensor i, $\hat{m}_l^{st}$ and $\hat{m}_r^{st}$ represent image coordinates of reference points in the first and second cameras, and $\hat{m}_l^{st}(\bullet)$ and $\hat{m}_r^{st}(\bullet)$ represent coordinates of the re-projected image; and step A05: implementing optimization estimation for the system parameters by using a minimum target function to obtain the structural parameter $r_s^i,t_s^i$ and the internal parameters $\{K_l^i,\theta_l^i\}$ and $\{K_r^i,\theta_r^i\}$ of the node for deep reconstruction of the sensor i, wherein $r^i,t^i$ represents a transformation relationship between the sensor i and the global coordinate system.

The present invention provides a large-scale human body three-dimensional scanning system formed of a sensor network of multiple control base stations based on distributed computation. The human body three-dimensional scanning system has the following advantages: firstly, on the prerequisite that the effective view fields of the various distributed sensors are subjected to no spatial overlap, the structural parameters and the global matching parameters of all the sensors are calibrated. Secondly, a corresponding point search method utilizing phase shift in combination with the random structured light reduces image collection time for acquiring single view point depth data. Thirdly, by using the concept of time reuse, the overall data collection time is shortened, and meanwhile the design of distributed computation enhances the computing capability of the entire system, and thus the data acquisition speed is improved. Fourthly, automatic matching of the depth data of different sensors is implemented according to the calibrated global matching parameters of the different sensors. Fifthly, according to the embodiments of the present invention, system debugging and expansion are convenient, the automation degree is high, and the process of three-dimensional scanning is simple.

DETAILED DESCRIPTION OF THE EMBODIMENTS

Figure 1:
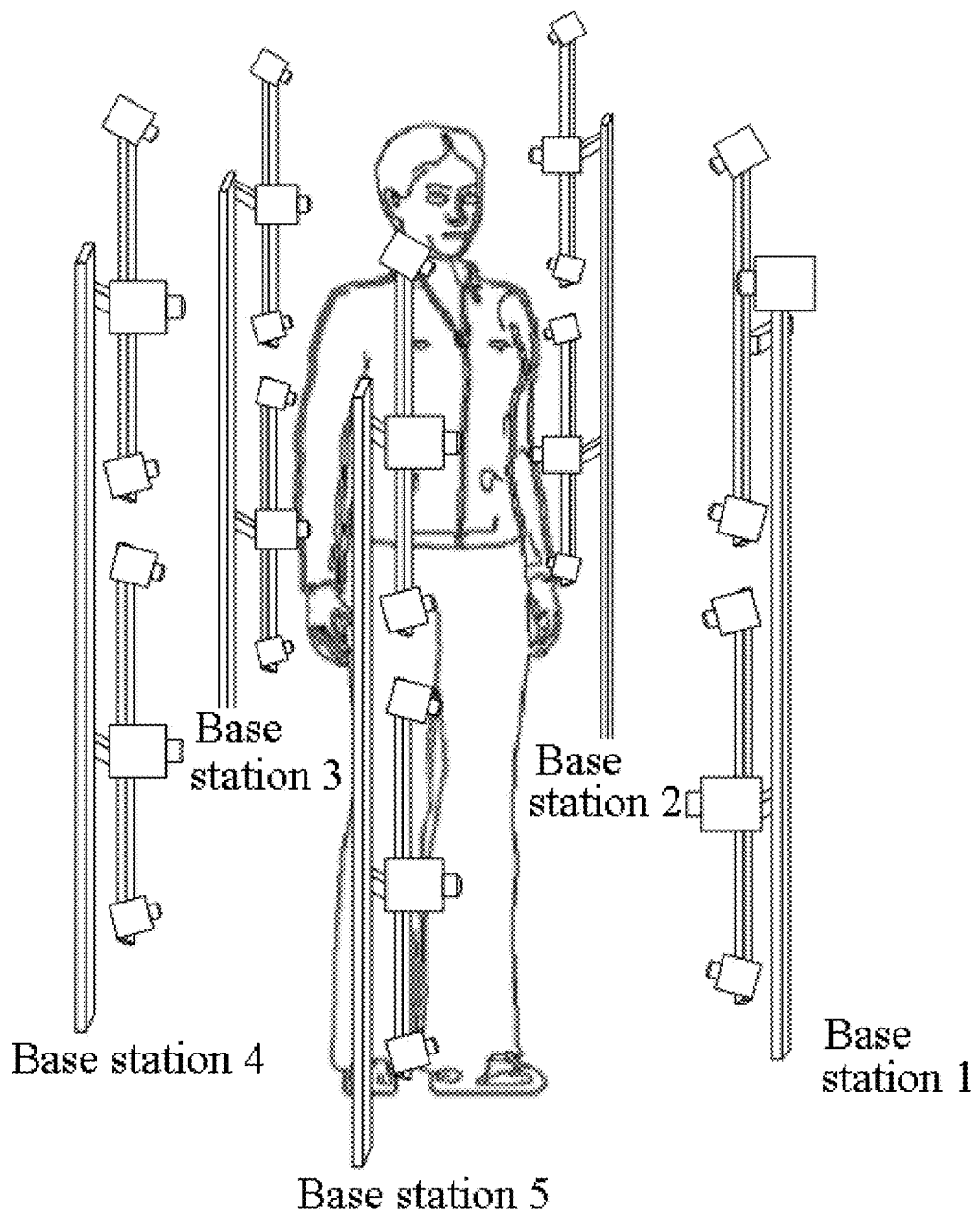
FIG. 1 is a schematic diagram illustrating deployment of multiple control base stations according to the present invention.
Figure 2:
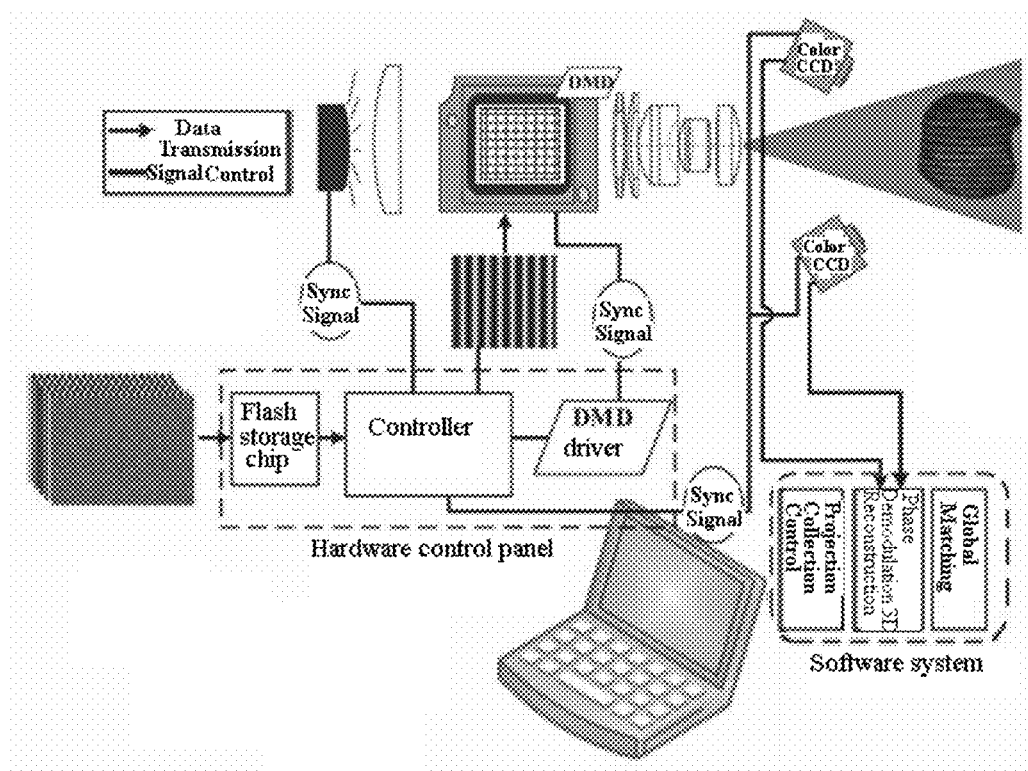
FIG. 2 is a block diagram illustrating principles of a three-dimensional sensor according to the present invention.

To make the objectives, technical solutions, and advantages of the present invention clearer, the present invention is further described with reference to specific embodiments and attached drawings. It should be understood that the embodiments described here are only exemplary ones for illustrating the present invention, and are not intended to limit the present invention.

According to an embodiment of the present invention, a host is employed to control two vertically arranged three-dimensional sensors to form a scanning control base station, such that data of upper part and lower part of a human body is acquired from a view angle and three-dimensional reconstruction is achieved. A human body scanning system is formed of five such control base stations so as to acquire relatively complete and fine human body surface three-dimensional data.

A human body three-dimensional imaging process according to an embodiment of the present invention covers four stages, that is, configuration and space deployment of the control base stations, calibration of multiple control base stations of the scanning system, reconstruction of single view point depth data reconstruction, and automatic matching of depth data from all different view points. The main principles are as follows:

1. Spatial Deployment and Configuration of the Control Base Station 1.1 The number of control base stations to be deployed in the entire scanning system is determined according to the fineness and integrity of the human body scanning data. Generally, on the prerequisite that the requirements on fineness and integrity are satisfied, a smallest number of control base stations shall be used. Typically, the number of control base stations is three to six. In this embodiment, five control base stations are used.

1.2 Considering the imaging lenses and effective view fields of the system structured light projection device and the camera, an imaging working distance of the control base stations and a suitable angle between any two control base stations in the system are commissioned. In this embodiment, the spacing of the control base stations is about 1.2 m. To be specific, the five control base stations are evenly arranged on a circumference with the radius of 1.2 m, wherein the circle center is a measurement space center of the system.

1.3 The embodiments are applicable to adults, and the scanning height is not more than 2.2 m. Two sets of vertically-arranged three-dimensional depth sensors are configured for each control base station. In a scanning system dedicated to children of no taller than 1.2 m, only one set of depth sensor needs to be configured for each control base station.

2. Calibration of Multiple Control Base Stations of the Scanning System 2.1 Preparation of a three-dimensional target. Mark points are adhered on the surface of an object capable of covering the system measurement space. Spatial three-dimensional coordinates of the mark points are reconstructed in combination with close range measurement method, and the reconstructed coordinates are used as a calibrated reference of each three-dimensional sensor.

2.2 The three-dimensional target is placed into the measurement space, and each time the three-dimensional target is rotated by 45 degrees, the first and second cameras of each three-dimensional sensor in the system are controlled to shoot the target to obtain calibrated images. As a result, each camera sequentially collects eight calibrated images at eight different positions of the target.

2.3 The mark points of the images acquired by each camera are processed. By means of image processing and automatic recognition technologies, mark point edges are obtained according to the subpixel edge extraction algorithm, and the image coordinates at the center are obtained through fitting. The mark point is uniquely identified by means of the coding information, thus a corresponding relationship between mark points of the first and second cameras of each three-dimensional sensor, and the three-dimensional coordinates of each mark point are acquired.

2.4 By means of the mark point image coordinates and the corresponding spatial three-dimensional coordinates, the internal parameter and external parameter of each camera are calibrated, and meanwhile the structural parameter of each three-dimensional sensor, a transformation relationship between all the sensors and the global coordinates are calibrated.

3. Reconstruction of Single View Point Depth Data Reconstruction 3.1 Image sequences are collected. The host of the control base station sends a serial port signal to the control panel, and the control panel sends a coding pattern to the projection module according to the serial port signal and meanwhile triggers image collection of the first and second cameras. The image sequence collected via projection is formed of a multi-step phase-shift image and a pseudo random coding image, or formed of a multi-step phase-shift image and one grey coding image, or formed of a multi-step phase-shift image and a temporal phase unwrapping image. The more steps in the phase-shift image, the higher the precision is. However, increase of the steps would affect the projection speed. As a preferred embodiment of the present invention, a four-step phase-shift image and a pseudo random coding image are used for implementation of the present invention, and description is given hereinafter using such implementation as an example.

3.2 The corresponding point search solution integrating phase shift and pseudo random coding is employed to establish a corresponding relationship between points of the first and second cameras. Considering the structural parameter of the three-dimensional sensor, three-dimensional depth data of the sensor is reconstructed.

4. Automatic Matching of Depth Data from all Different View Points 4.1 By means of the transformation relationship between different sensors and the global coordinate system that is obtained via calibration, upper and lower geometric depth data obtained in each control base station is transformed to the global coordinate system, and then transmitted to the control center through a Gigabit switch.

4.2 After receiving the depth data of all the control base stations, the control center refines the matching result according to the closest point iteration method, and obtains integral data of the surface of a human body.

According to the above described four steps, detail description is given hereinafter with reference to the accompanying drawings of the embodiments.

Specifically, in the present invention, a plurality of control base stations are configured to: construct a human body measurement space, upon receipt of a collection instruction from a control center, perform coding pattern projection for a human body in a human body measurement space, and meanwhile collect human body image information observed from their respective view angles, and to perform depth computation for their respective human body image information to obtain three-dimensional geometric depth data in their respective local coordinate systems; to transform the three-dimensional geometric depth data from their respective local coordinate systems to a global coordinate system; to perform white light projection for the human body, collect texture data of human body colors observed from their respective view angles, and send the collected texture data together with the three-dimensional geometric depth data transformed in step B to the control center, wherein the control base stations are interconnected, and are deployed surrounding the human body to form a measurement space completely covering the human body, each control base station comprises two longitudinally arranged three-dimensional sensors, wherein the two three-dimensional sensors are respectively configured to acquire human body image information and texture data of an upper part and a lower part of the human body from the view angle of the control base station.

A control center is configured to: upon receipt of the three-dimensional geometric depth data and corresponding surface texture data thereof in the global coordinate system that are transmitted by the control base stations, firstly splice the three-dimensional geometric depth data collected by the control base stations to obtain a human body three-dimensional model, and then remove redundancy for the human body integral model to obtain a fused human body three-dimensional model; afterwards, perform a weighted operation for texture data of an overlapped portion of all human body colors that is collected by the control base stations to obtain fused texture data; and finally one-to-one associate the fused human body three-dimensional model with the fused texture data. For reduction of cost, the control center may be one of the control base stations.

FIG. 1 is a schematic diagram illustrating specific spatial positions of five control base stations according to an embodiment of the present invention. The five control base stations are evenly arranged along a circumference with a radius of about 1.2 m, and the imaging directions of the three-dimensional sensors of each control base station all face towards the measurement space at the position of the circle center. It should be understood that during specific implementation, different requirements are imposed on the fineness and integrity of the human body data. The number of control base station is generally 3 to 6 sets, not necessarily 5 sets. The working distance of the control base station needs to accommodate the focal distances of different imaging lenses, which is not limited to about 1.2 m.

Figure 3:
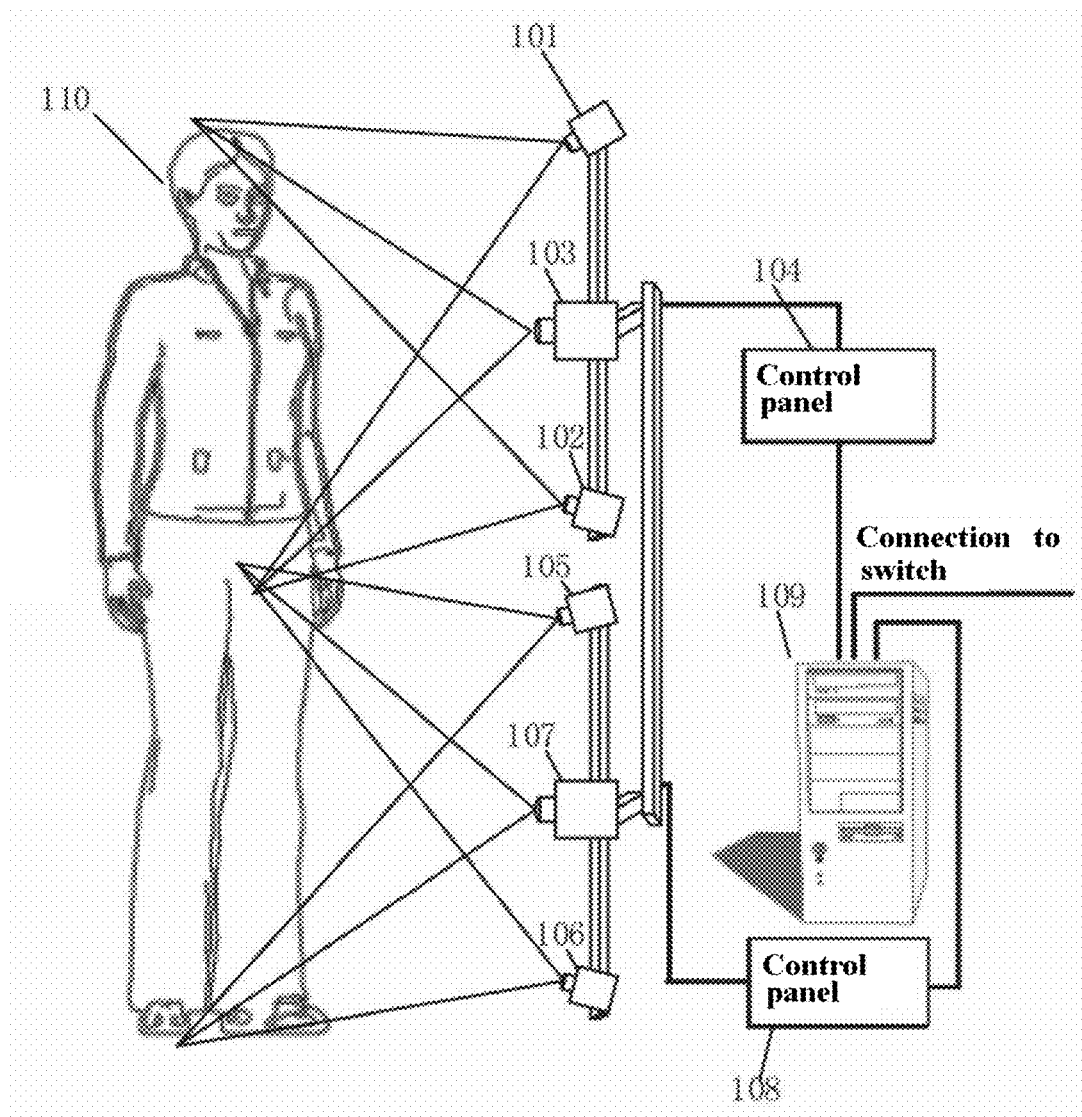
FIG. 3 is a schematic diagram illustrating an internal structure of a control base station according to an embodiment of the present invention.
Figure 4:
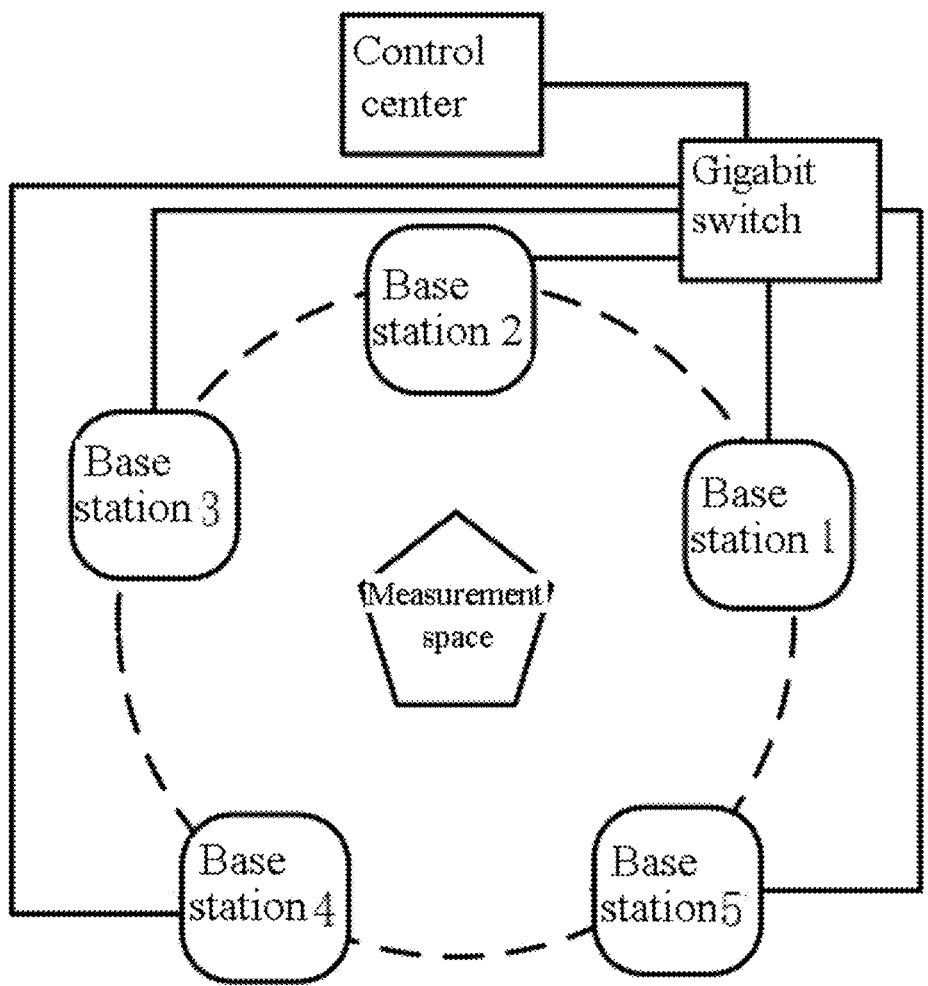
FIG. 4 is a schematic diagram illustrating control of a control base station by a control center according to the present invention.

FIG. 3 is a schematic diagram illustrating working of an internal structure of a control base station according to the present invention. Two three-dimensional sensors having a binocular structure are vertically arranged in a column, and one host controls collection of images and completes reconstruction computation of the depth data. In this way, the depth data of the upper and lower parts of a human body may be acquired, and matching of the depth data to the global coordinates is achieved. In FIG. 3, 101 denotes a CCD video camera, 102 denotes a CCD video camera, 105 denotes a CCD video camera, and 106 denotes a CCD video camera; 103 denotes a CCD projector, and 107 denotes a CCD projector; 104 denotes a control panel, and 108 denotes a control panel; 109 denotes a host; and 110 denotes a human body to be detected. 101, 102 and 103 form a three-dimensional sensor 1 at the upper portion, which receives a signal from the control panel 104 and synchronizes the projection collection image sequence. Correspondingly, the working principle of a sensor 2 formed of 105, 106 and 107 is the same as that of the sensor 1. The host 109 is connected to the control panels 104 and 108 through different serial ports, and implements control of projection collection for the sensors 1 and 2 through different COM ports.

In this embodiment, a three-dimensional target capable of covering the measurement space of the human body is made. The cross section of the three-dimensional target is approximately a cube hexahedron, with the side length being 0.4 m and the height being 2 m, and the surface of the three-dimensional target is adhered with 750 coding mark points, wherein each mark point has a different coding strip as a unique identifier, as illustrated in FIG. 6(a). By means of close range photography measurement, the three-dimensional coordinates at the center of each mark point is corrected to obtain precise spatial three-dimensional coordinates. This embodiment specifically comprises the following steps:

step 1: shooting a three-dimensional target from 58 different view angles by using a high-resolution digital camera to obtain target images, as illustrated in FIG. 6(b) (images shot from partial view angles);

step 2: performing central positioning and decoding for the mark points in the target image, and acquiring a corresponding relationship between images from different view angles, and image coordinates according to different coding values of the coding points;

2.1 Gaussian filtering to remove image noise;

2.2 pixel-level coarse positioning of the ellipse edge by using the edge detection operator (Canny operator)

2.3 automatic identification of the mark point (a point satisfying the following two conditions is considered as a mark point: the pixels included in the profile of the mark point fluctuate within a specific range, and the profile of the mark point is closed);

2.4 sub-pixel precise positioning of the ellipse edge (cubic polynomial curve surface fitting is performed for the 5×5 neighborhood of each pixel at the pixel-level edge, and the position of the local extremum of the first-order derivative is acquired, i.e., the sub-pixel position);

2.5 least squares fitting is carried out for the ellipse edge to obtain subpixel coordinates of the ellipse center, which are considered as the central image coordinates of the mark point.

step 3: by means of bundle adjustment, acquiring image coordinates of the global coordinates $X_j$ of each of the different codes at a shooting view angle i, and optimizing an error of the re-projection, as represented by formula (1):

$$\min \text{cost}(K, \theta, X_j) = \sum_{i=1}^{N} \sum_{j=1}^{M} \{\|\hat{m}_{ij} - \tilde{m}_{ij}(K, \theta, r_i, t_i, X_j)\|^2\} \quad (1)$$

wherein $$K = \begin{bmatrix} f & \alpha & u_0 \\ 0 & f & v_0 \\ 0 & 0 & 1 \end{bmatrix},$$

$\{f, u_0, v_0, \alpha\}$ respectively represent a focal distance, a primary point x-coordinate, a primary point y-coordinate and a tilt factor, and θ={k₁,k₂,k₃,p₁,p₂}, (k₁,k₂,k₃) representing lens radial distortion coefficients, and (p₁,p₂) representing lens tangential distortion coefficients; M represents the number of mark points; N represents the number of images; $(r_i,t_i)$ represents a shooting gesture; and $\hat{m}_{ij}$ represents coordinates of a circle center image; as such the global coordinates $X_j$ of different coding points are obtained and target correction is implemented, as illustrated in FIG. 6(c). For detail solution of the non-linear optimization problem, reference may be made to *Calibration Technique for Phase-Aided Optical 3D Measurement Systems*, by Ying Yongkai, 2012, Doctor of Philosophy Dissertation of Tianjin University.

Figure 7:
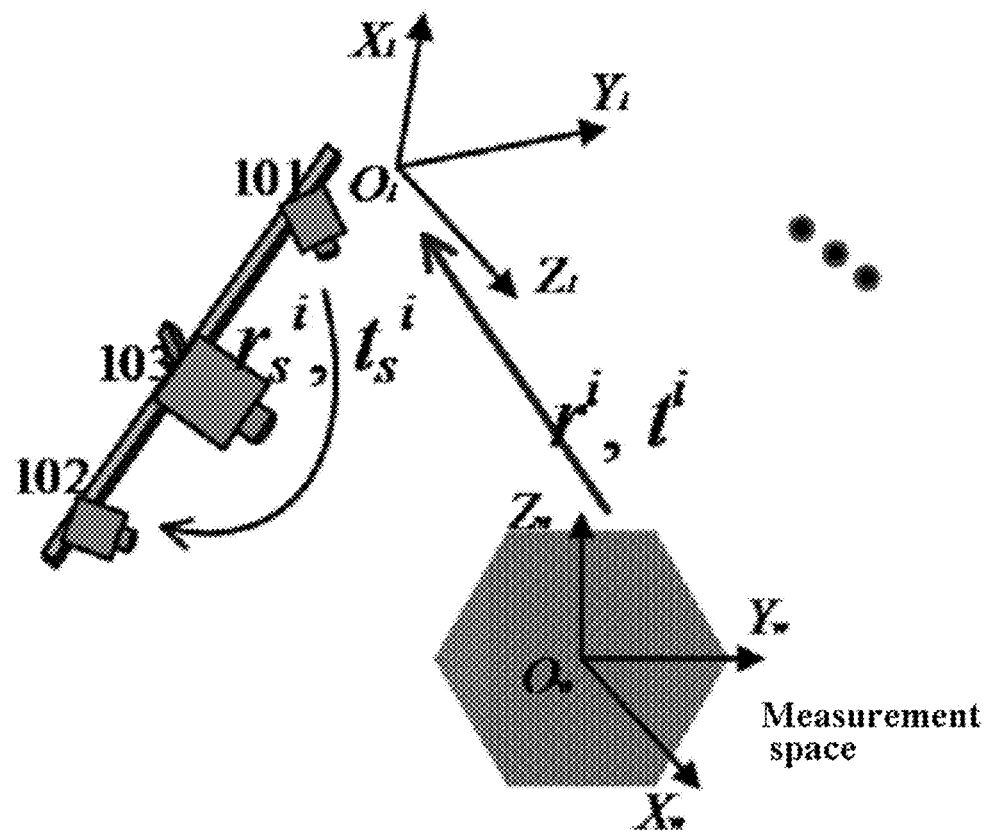
FIG. 7 is a schematic diagram illustrating calibration principles according to the present invention.

Upon completion of correction of the three-dimensional target, the corrected three-dimensional target is placed into the measurement space of the system to calibrate the system parameter and matching parameter of the three-dimensional sensor in the system. In the embodiments, five control base stations are used, wherein each control base station has two three-dimensional sensors having a binocular system, and there are totally 10 sets of three-dimensional sensors. These sensors functions the same and play the same role in the system. FIG. 7 illustrates calibrated model of a three-dimensional sensor, wherein $r^i,t^i$ represents a vector of the rotation, translation and transformation of the first and second cameras, which indicates a transformation relationship between the global coordinate system and the local coordinate system of the sensor. Each time the target is rotated by about 45 degrees, each camera in the system is controlled to shoot the target to obtain target images, and totally eight groups of images of different positions of the target are obtained. With respect to a certain node i, the structural parameter of the binocular sensor and the external parameter of the node are used as parameter vectors to be optimized, and an optimization target function is constructed, as represented by formula (2):

$$\text{cost}(\tau_i) = \sum_{t=1}^{N}\sum_{s=1}^{M}\left\{\left\|\hat{m}_l^{st} - \tilde{m}_l^{st}(K_l^i, \theta_l^i, r_s^j, t_s^j; X_w^t)\right\|^2 + \left\|\hat{m}_r^{st} - \tilde{m}_r^{st}(K_r^i, \theta_r^i, r^i, t^i, r_s^i, t_s^i; X_w^t)\right\|^2\right\} \quad (2)$$

In the above formula, subscript s represents the s-th shooting gesture of the system, t represents the t-th marker point in the target, $X_w^t$ represents the coordinates of the t-th marker point in the global coordinate system, $\tau_i=\{K_l^i,\theta_l^i,K_r^i,\theta_r^i,r^i,t^i,r_s^i,t_s^i\}$ represents a to-be-optimized parameter vector of the sensor node i, $\{K_l^i,\theta_l^i\}$ and $\{K_r^i,\theta_r^i\}$ respectively represent an internal parameter and a distortion of the first and second cameras of the sensor i, $\hat{m}_l^{st}$ and $\hat{m}_r^{st}$ represent image coordinates of reference points in the first and second cameras, $r^i,t^i$ represents a transformation relationship of the first and second cameras, $r_s^i,t_s^i$ is represents an external parameter of the s-th shooting gesture, and $\tilde{m}_l^{st}(\bullet)$ and $\tilde{m}_r^{st}(\bullet)$ represent coordinates of the re-projected image. For details about the specific mathematical model, reference may be made to *Computer Vision* (by Ma Songde, Zhang Zhengyou, Science Press, 1998). Optimization estimation is implemented for the system parameters by using the minimum target function formula (2) to obtain the structural parameter $r_s^i,t_s^i$ and the internal parameters $\{K_l^i,\theta_l^i\}$ and $\{K_r^i,\theta_r^i\}$ (i=1, 2, 3 . . . 10) of the node for deep reconstruction of the sensor i, wherein $r^i,t^i$ represents a transformation relationship between the sensor i and the global coordinate system, and with respect to different sensors, the internal parameter and the structural parameter may be obtained while the matching parameter $r^i,t^i$(i= 1, 2, 3 . . . 10) may also be obtained by using the same method.

Figure 8:
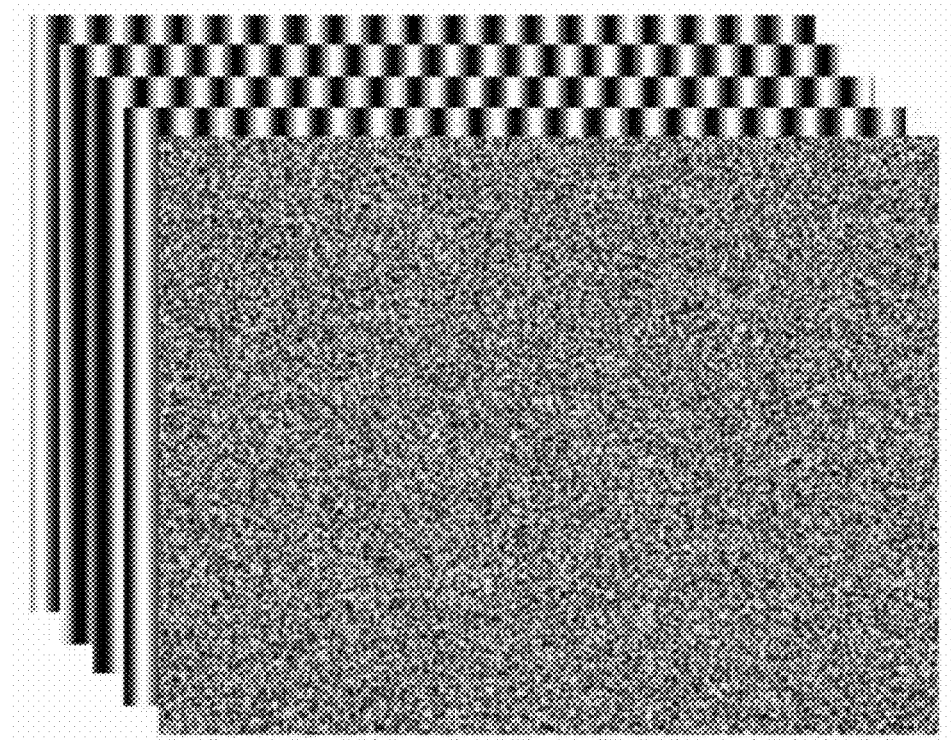
FIG. 8 is a schematic diagram illustrating a projection pattern sequence according to the present invention.

Upon completion of the system calibration, the key point of reconstruction of the three-dimensional geometric depth data lies in searching of the corresponding points of the first and second cameras in the sensor. A corresponding point search method utilizing phase shift in combination with the random structured light is employed in the present invention to shorten image sequence collection time. According to the method, over 10 image sequences may be shortened to five images, and the image sequences collected via projection are as illustrated in FIG. 8. The corresponding point search method may comprise the following steps:

step 1: performing epipolar rectification for the upper body image and the lower body image according to pre-calibrated parameters of the first and second cameras, such that the same y-coordinates of the upper body image and the lower image are subjected to an epipolar corresponding relationship;

step 2: according to four-step phase-shifting algorithm, obtaining wrapped phases of the first and second cameras by means of computation with a phase-shift image subjected to epipolar rectification;

step 3: traversing the j-th row of the second camera, wherein a wrapped phase value at a pixel position $p^1(i,j)$ in the wrapped phase of the first camera is w(i, j), and a pixel position $p^r(ir,j)$ having a minimum phase difference is capable of being found in each wrapping cycle, these pixel positions $p^r$ being corresponding candidate points of the pixel position $p^1$ of the first camera;

step 4: using pseudo random coding images of the first and second cameras as a target image and a to-be-matched image respectively, and considering that a size of a matching window with $p^l$ as a center on the target image is (2w+1)× (2w+1), wherein a grey value of any pixel $p^l$ in the window is marked as $p^l(u^l,u^l)$, whereas a grey value of the corresponding point of the candidate point $p^r$ on the to-be-matched image is $p^r(u^r,u^r)$, and a normalized correlation measurement function $N_{CC}$ of the two windows is expressed by the following formula:

$$Ncc(I_l, I_r) = F(i, j, ir, j) = \frac{\left\{\sum_{u=-w}^{w}\sum_{v=-w}^{w}(p^l(i+u, j+v) - \overline{p^l}) * (p^r(ir+u, j+v) - \overline{p^r})\right\}^2}{\left\{\sum_{u=-w}^{w}\sum_{v=-w}^{w}(p^l(i+u, j+v) - \overline{p^l})\right\}^2 * \left\{\sum_{u=-w}^{w}\sum_{v=-w}^{w}(p^r(ir+u, j+v) - \overline{p^r})\right\}^2} \quad (3)$$

in the above formula, $\overline{p^l}$ and $\overline{p^r}$ respectively represent an average image grey, u and v respectively represent coordinates in a selected matching window, $p^l(i+u,j+v)$ represents a grey value at a pixel position (i+u,j+v) in the window of the first camera, and $p^r(ir+u,j+v)$ represents a grey value at a pixel position (ir+u,j+v) in the window of the second camera; upon epipolar rectification, each candidate point has the same y-coordinate j; a correlation measurement function is obtained by traversing all the candidate points (ir,j) of the second camera and the correlated values of a position (i,j) of the first camera, wherein only the corresponding point has a higher correlation value, and pixel-level corresponding points of the first and second cameras are obtained from the candidate points by defining a threshold; and step 5: upon obtaining the pixel-level points, obtaining a corresponding relationship of subpixels according to the wrapped phase differences of the first and second cameras, and reconstructing three-dimensional geometric depth data in combination with pre-calibrated internal parameters and structural parameters of the first and second cameras.

With respect to the sensor i, a depth image of the view point may be obtained, and then the depth image of the view point may be matched to the global coordinate system by means of coordinate transformation as illustrated in formula (4).

$$\begin{cases} X_{w,1} = R_1^{-1} \cdot X_1 - R_1^{-1} \cdot T_1 \\ \dots \\ X_{w,i} = R_i^{-1} \cdot X_i - R_i^{-1} \cdot T_i \\ \dots \\ X_{w,10} = R_{10}^{-1} \cdot X_{10} - R_{10}^{-1} \cdot T_{10} \end{cases} \quad (4)$$

In the above formula, $X_i$ represents the coordinates of a three-dimensional point in a local coordinate system of the i-th three-dimensional sensor, $R_i$ and $T_i$ represent a transformation matrix from the local coordinate system of the i-th three-dimensional sensor to a global coordinate system, $X_{w,i}$ represents the coordinates of the point $X_i$ that is transformed to the global coordinate system, which is obtained through transformation of the calibrated result $r^i, t^i$ (i=1, 2, 3 . . . 10).

Upon completion of matching of different view points, each control base station transmits the depth data to the control center over a Gigabit network. Afterwards, the control center inspects the matching precision. If the precision is poor, fine matching may be further carried out. For details about the fine matching, reference may be made to *Key Techniques in Multiple Range Images Modeling* (by Liu Xiaoli, Doctor of Philosophy Dissertation of Tianjin University, 2008).

Figure 5:
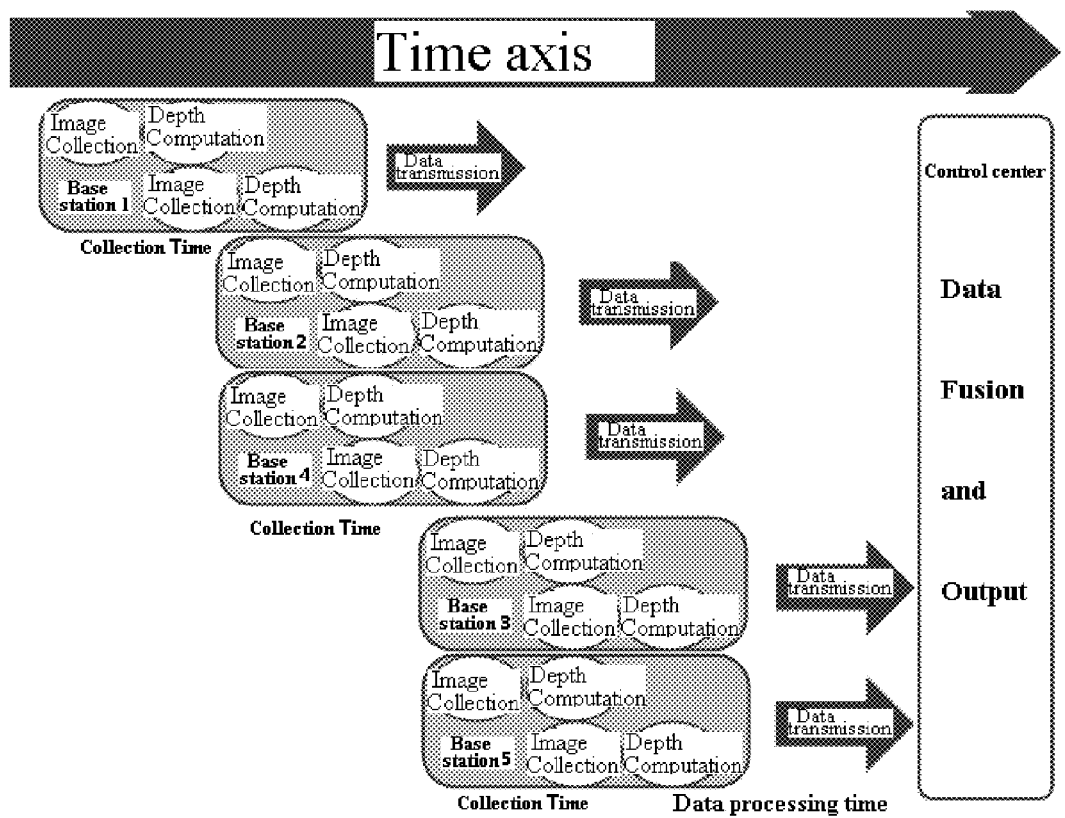
FIG. 5 is a schematic diagram illustrating time reuse of a control base station according to the present invention.
Figure 6:
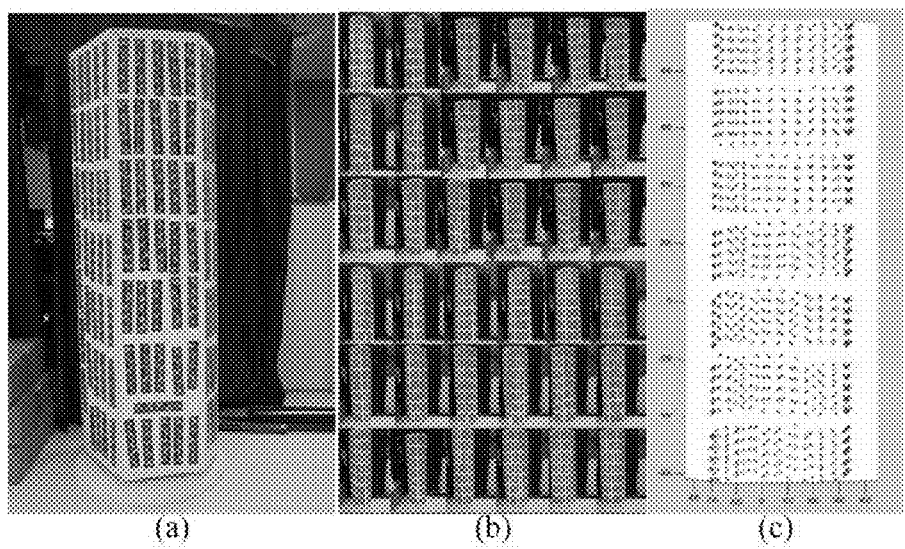
FIG. 6 is a schematic diagram illustrating a calibration reference according to the present invention.
Figure 9:
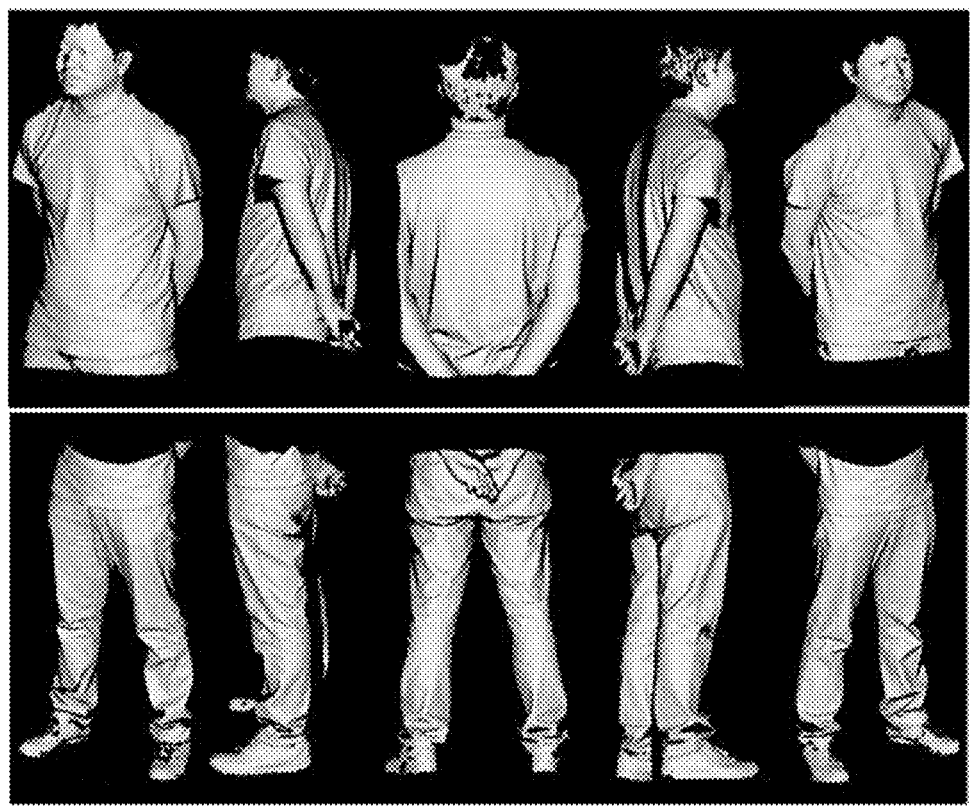
FIG. 9 is a schematic diagram illustrating in-depth data collected by three-dimensional sensors of various control base stations according to the present invention.
Figure 10:
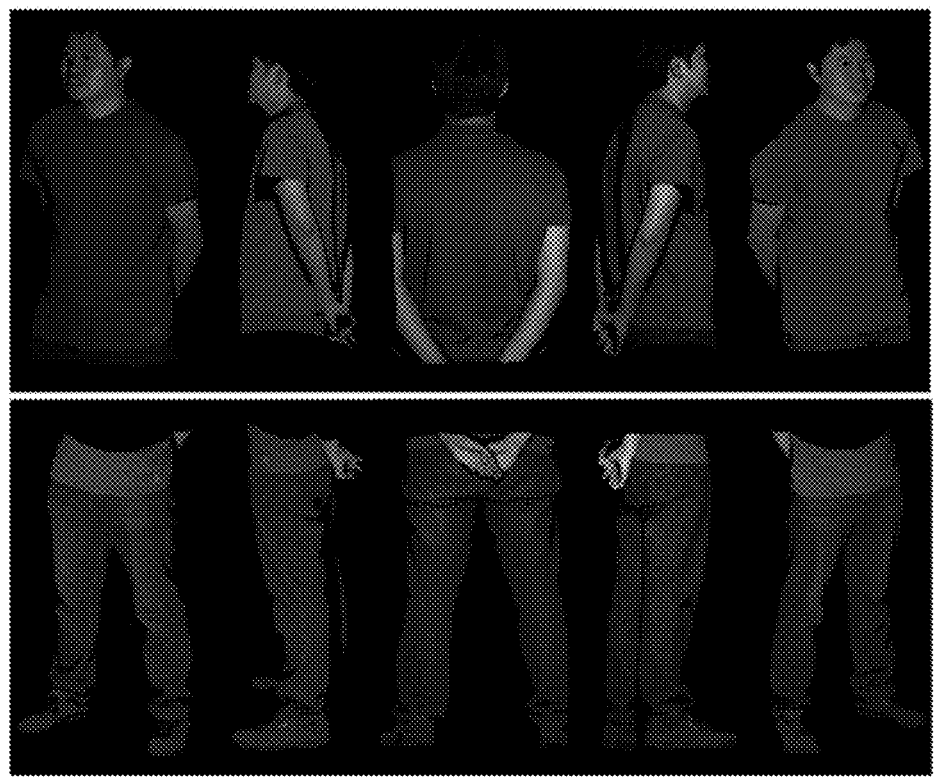
FIG. 10 is a schematic diagram illustrating in-depth data with color information mapped thereto according to the present invention.
Figure 11:
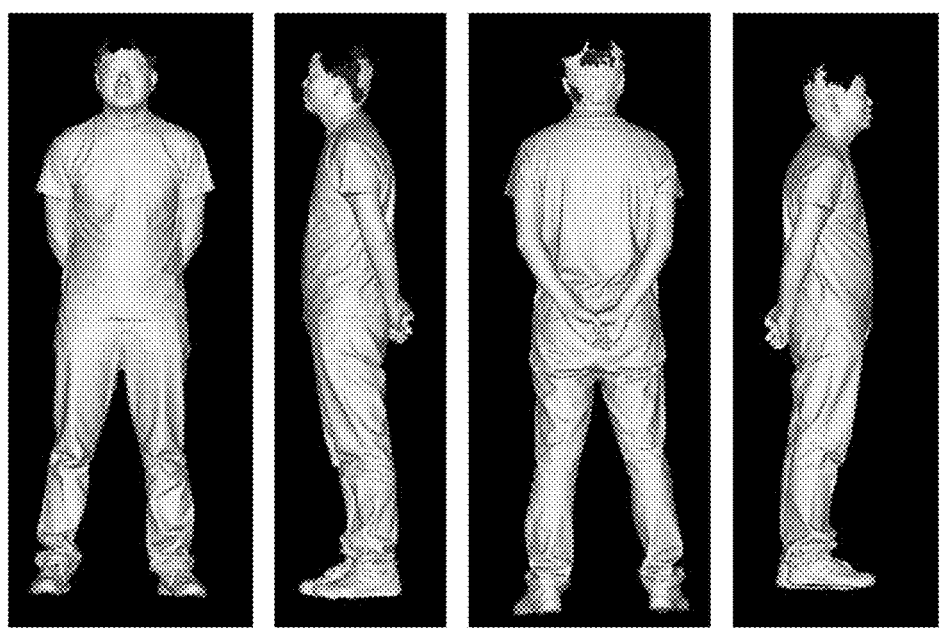
FIG. 11 is a schematic diagram of a three-dimensional model after matching is performed according to the present invention.

Data acquisition process and data acquisition result exhibition are described by using human body scanning as an example. According to the above steps, as illustrated in FIG. 1, five control base stations are deployed, wherein each control base station is equipped with two sets of three-dimensional sensors, an upper one and a lower one. The entire system is calibrated by using the three-dimensional reference points as illustrated in FIG. 6. According to the control flowchart as illustrated in FIG. 5, the upper and lower sets of three-dimensional sensors are triggered to acquire image sequences and reconstruct the three-dimensional depth data of the view point, as illustrated in FIG. 9. Color information is mapped to the depth data, as illustrated in FIG. 10. Afterwards, the control base stations match the depth data to a uniform coordinate system according to the calibrated parameters, and then transmit the depth data to the control center. Upon receiving the depth data, the control center further carries out fine matching and data fusing. FIG. 11 illustrates a result output upon depth image fusion.

The above description is merely preferred embodiments of the present invention, but are not intended to limit the present invention. Any modification, equivalent replacement, or improvement made without departing from the spirit and principle of the present invention should fall within the protection scope of the present invention.

What is claimed is:

1. A human body three-dimensional imaging method comprising the following steps:

step A: providing a control center and at least three interconnected control base stations and arranging the at least three control base stations on a circumference of a circle centered on a human body to form a measurement space completely covering the human body, with each control base station comprising two vertically arranged three-dimensional sensors and each three-dimensional sensor comprising a projector and two cameras, determining respective local three-dimensional geometric depth data by the control base stations in their respective local coordinate systems by performing depth computation for respective human body image information collected by the cameras upon projecting a coding pattern on the human body by the projector, wherein the two three-dimensional sensors of each control base station are respectively configured to acquire three-dimensional geometric depth data and texture data of an upper part and a lower part of the human body from the view angle of the control base station;

step B: transforming the three-dimensional geometric depth data by each of the control base stations from its local coordinate systems to a global coordinate system;

step C: obtaining texture data of human body colors by each of the control base stations by projecting white light to the human body and observing from its view angle, and sending the collected texture data together with the three-dimensional geometric depth data transformed in step B to the control center; and step D: determining a human body three-dimensional model by the control center by splicing the three-dimensional geometric depth data received from the control base stations in the global coordinate system, determining a fused human body three-dimensional model by removing redundancy for an integral model of the human body; determining fused texture data by performing a weighted operation for texture data of an overlapped portion of all human body colors received from the control base stations; and associating the fused human body three-dimensional model with the fused texture data;

wherein the human body image information collected in step A is an image sequence formed of a multi-step phase-shift image and one pseudo random coding image, or an image sequence formed of a multi-step phase-shift image and a Grey coding image, or an image sequence formed of a multi-step phase-shift image and a temporal phase unwrapping image, wherein an upper body image and a lower body image collected by the two three-dimensional sensors of each of the control base stations are not overlapped, and are capable of being spliced into an integral human body image observed from the view angle of the control base station, and the cameras for collecting the upper body image and the lower body image are respectively defined as first cameras and second cameras; and the performing depth computation for the human body image information to obtain three-dimensional geometric depth data in step A comprises:

step A1: performing epipolar rectification for the upper body image and the lower body image according to pre-calibrated parameters of the first and second cameras, such that the same y-coordinates of the upper body image and the lower image have an epipolar corresponding relationship;

step A2: according to four-step phase-shifting algorithm, obtaining wrapped phases of the first and second cameras by means of computation with a phase-shift image subjected to epipolar rectification;

step A3: traversing the j-th row of the second camera to obtain a pixel position $p^r(ir,j)$ having a minimum phase difference in each wrapping cycle, wherein a wrapped phase value at a pixel position $p^l(i,j)$ in the wrapped phase of the first camera is $w(i,j)$, and these pixel positions $p^r$ are used as corresponding candidate points of the pixel position $p^l$ of the first camera;

step A4: using pseudo random coding images of the first and second cameras as a target image and a to-be-matched image respectively, considering a matching window with $p^l$ as a center on the human body image has a size of $(2w+1)\times(2w+1)$, wherein a grey value of any pixel $p^l$ in the window is marked as $p^l(u^l,u^l)$, whereas a grey value of a corresponding point of the candidate point $p^r$ on the to-be-matched image is $p^r(u^r, u^r)$, and a normalized correlation measurement function $N_{CC}$ of the two windows is expressed by the following formula:

$$Ncc(I_l, I_r) = F(i, j, ir, j) = \frac{\left\{\sum_{u=-w,}^{w} \sum_{v=-w}^{w} \left(p^l(i+u, j+v) - \overline{p^l}\right) * \left(p^r(ir+u, j+v) - \overline{p^r}\right)\right\}^2}{\left\{\sum_{u=-w,}^{w} \sum_{v=-w}^{w} \left(p^l(i+u, j+v) - \overline{p^l}\right)\right\}^2 * \left\{\sum_{u=-w,}^{w} \sum_{v=-w}^{w} \left(p^r(ir+u, j+v) - \overline{p^r}\right)\right\}^2}$$

wherein $\overline{p^l}$ and $\overline{p^r}$ respectively represent an average image grey, u and v respectively represent coordinates in a selected matching window, $p^l(i+u,j+v)$ represents a grey value at a pixel position $(i+u,j+v)$ in the window of the first camera, and $p^r(ir+u,j+v)$ represents a grey value at a pixel position $(ir+u,j+v)$ in the window of the second camera; upon epipolar rectification, each candidate point has the same y-coordinate j; a correlation measurement function is obtained by traversing all the candidate points $(ir,j)$ of the second camera and the correlated values of a position $(i,j)$ of the first camera, wherein only the corresponding point has a higher correlation value, and pixel-level corresponding points of the first and second cameras are obtained from the candidate points by defining a threshold; and step A5: upon obtaining the pixel-level points, obtaining a corresponding relationship of subpixels according to the wrapped phase differences of the first and second cameras, and reconstructing three-dimensional geometric depth data in combination with pre-calibrated internal parameters and structural parameters of the first and second cameras.

2. The human body three-dimensional imaging method according to claim 1, wherein time sequence control of image collection and depth computation is performed for the cameras in the three-dimensional sensors of all the control base stations in the following way:

controlling each camera in the control base stations to collect the human body image, performing depth computation for the collected human body image, and controlling the (i+l)-th camera to start collecting a human body image while performing depth computation for a human body image collected by the i-th camera.

3. The human body three-dimensional imaging method according to claim 1, wherein in step B, the control base stations transform the three-dimensional geometric depth data from their respective local coordinate systems to a global coordinate system according to the following formula:

$$\begin{cases} X_{w,1} = R_1^{-1} \cdot X_1 - R_1^{-1} \cdot T_1 \\ \ldots \\ X_{w,i} = R_i^{-1} \cdot X_i - R_i^{-1} \cdot T_i \\ \ldots \\ X_{w,10} = R_{10}^{-1} \cdot X_{10} - R_{10}^{-1} \cdot T_{10} \end{cases}$$

wherein $X_i$ represents the coordinates of a three-dimensional point in a local coordinate system of the i-th three-dimensional sensor, $R_i$ and $T_i$ represent a transformation matrix from the local coordinate system of the i-th three-dimensional sensor to a global coordinate system, $X_{wi}$ represents the coordinates of the point $X_i$ that is transformed to the global coordinate system, which is obtained through transformation of a calibrated result $r^i,t^i(i=1, 2, 3 \ldots 10)$;

wherein the $r^i,t^i(i=1, 2, 3 \ldots 10)$ is calibrated through the following steps:

step A01: constructing a three-dimensional reference target with suitable size and attaching the coding marks on it for simultaneous calibrating all sensors; shooting the three-dimensional reference target from multiple different view angles by using a high-resolution digital camera to obtain target images; wherein the three-dimensional target is capable of covering the measurement space and is adhered with a plurality of coding mark points on the surface thereof, each mark point has a different coding strip as a unique identifier;

step A02: performing central positioning and decoding for the mark points in the target image, and acquiring a corresponding relationship between images from different view angles, and image coordinates according to different coding values of the coding points;

step A03: acquiring image coordinates $\hat{m}_{ij}(K,\theta,r_i,t_i;X_j)$ of the global coordinates $X_j$ of each of the different codes at a shooting view angle i by means of bundle adjustment, and optimizing an error of the re-projection, as represented by the following formula:

$$\min \text{cost}(K, \theta, X_j) = \sum_{i=1}^{N} \sum_{i=1}^{M} \left\{\|\hat{m}_{ij} - \hat{m}_{ij}(K, \theta, r_i, t_i, X_j)\|^2\right\}$$

wherein $(K,\theta)$ represents an internal structural parameter of the camera, and $$K = \begin{bmatrix} f & \alpha & u_0 \\ 0 & f & v_0 \\ 0 & 0 & 1 \end{bmatrix},$$

$\{f,u_0,v_0,\alpha\}$ respectively representing a focal distance, a primary point x-coordinate, a primary point y-coordinate and a tilt factor, and O={k$_1$,k$_2$,k$_3$,p$_1$,p$_2$}, (k$_1$,k$_2$,k$_3$) representing lens radial distortion coefficients, and (p$_1$, p$_2$) representing lens tangential distortion coefficients; M represents the number of mark points; N represents the number of images; (r$_i$,t$_i$) represents a shooting gesture; and $\hat{m}_{ij}$ represents coordinates of a circle center image;

step A04: placing the corrected three-dimensional target into the measurement space, and the control base station collecting an image of the three-dimensional target upon each rotation; and with respect to a binocular node i, using a structural parameter of a binocular sensor and an external parameter of the node as parameter vectors to be optimized simultaneously, and constructing an optimized target function as represented by the following formula:

$$\text{cost}(\tau_i) = \sum_{t=1}^{N} \sum_{s=1}^{M} \left\{ \left\| \hat{m}_l^{st} - \bar{m}_l^{st}(K_l^i, \theta_l^i, r_s^i, t_s^i; X_w^t) \right\|^2 + \left\| \hat{m}_r^{st} - \bar{m}_r^{st}(K_r^i, \theta_r^i, r^i, t^i, r_s^i, t_s^i; X_w^t) \right\|^2 \right\}$$

wherein subscript s represents the s-th shooting gesture of the system, t represents the t-th mark point in the target, X$_w^t$ represents the coordinates of the t-th mark point in the global coordinate system, $\tau_i$={K$_l^i$,$\theta_l^i$,K$_r^i$,$\theta_r^i$, r$^i$,t$^i$,r$_s^i$, t$_s^i$} represents a to-be-optimized parameter vector of the sensor node i, {K$_l^i$,$\theta_l^i$} and {K$_r^i$,$\theta_r^i$} respectively represent an internal parameter and a distortion of the first and second cameras of the sensor, $\hat{m}_l^{st}$ and $\hat{m}_r^{st}$ represent image coordinates of reference points in the first and second cameras, r$^i$,t$^i$ represents a transformation relationship of the first and second cameras, r$_s^i$,t$_s^i$ represents an external parameter of the s-th shooting gesture, and $\hat{m}_l^{st}$(●) and $\hat{m}_r^{st}$(●) represent coordinates of the re-projected image; and step A05: implementing optimization estimation for the system parameters by using a minimum target function to obtain the structural parameter r$_s^i$,t$_s^i$ and the internal parameters {K$_l^i$,$\theta_l^i$} and {K$_r^i$,$\theta_r^i$} of the node for deep reconstruction of the sensor i, wherein r$^i$,t$^i$ represents a transformation relationship between the sensor i and the global coordinate system.

4. The human body three-dimensional imaging method according to claim 3, wherein after the placing the corrected three-dimensional target into the measurement space, the three-dimensional target is controlled to rotate for multiple times.

5. A human body three-dimensional imaging system comprising:

at least three interconnected control base stations arranged on a circumference of a circle centered on a human body to form a measurement space completely covering the human body, the at least three control base stations being configured to: project coding pattern for the human body, collect human body image information observed from their respective view angles, and perform depth computation for their respective human body image information to determine three-dimensional geometric depth data in their respective local coordinate systems; transform the three-dimensional geometric depth data from their respective local coordinate systems to a global coordinate system; and project white light to the human body, collect texture data of human body colors observed from their respective view angles, and send the collected texture data together with the three-dimensional geometric depth data transformed; wherein each control base station comprises two vertically arranged three-dimensional sensors, wherein the two three-dimensional sensors are respectively configured to acquire human body image information and texture data of an upper part and a lower part of the human body from the view angle of the control base station; and a control center connected with the at least three control base station configured to: to splice the three-dimensional geometric depth data received from the control base stations in the global coordinate system to obtain a human body three-dimensional model, and determine a fused human body three-dimensional model by removing redundancy for a human body integral model; and determine fused texture data by performing a weighted operation for texture data of an overlapped portion of all human body colors received from the control base stations; and associate the fused human body three-dimensional model with the fused texture data, wherein the control center is connected to the control base stations via a switch; and each three-dimensional sensor comprises:

a projector configured to sequentially perform coding pattern projection and white light projection to the human body;

a first camera and a second camera configured to collect image information presented upon the coding pattern projection of the human body, the image information being used for three-dimensional reconstruction of the human body; wherein the first camera collects texture data of the human body colors after the white light projection to the human body, the texture data being used for texture mapping to acquire color information of the three-dimensional model;

a control panel configured to send a to-be-projected pattern to a projector, control the projector to project the to-be-projected pattern on the human body, and control the cameras to collect image information; and a host connected to the control panel, and configured to control projection collection via the control panel, and perform depth computation and coordinate transformation for the human body image information collected by the cameras, wherein the camera is a color camera and the collected human body image information is an image sequence formed of a multi-step phase-shift image and one pseudo random coding image, or an image sequence formed of a multi-step phase-shift image and a Grey coding image, or an image sequence formed of a multi-step phase-shift image and a temporal phase unwrapping image, wherein each three-dimensional sensor comprises the first and second cameras, the two three-dimensional sensors of each control base station are configured to respectively collect an upper body image and a lower body image of the human body, wherein the upper body image and the lower body image are not overlapped and are capable of being spliced into an integral human body image observed from the view angle of the camera;

the host performs epipolar rectification for the upper body image and the lower body image based on the pre-calibrated parameters of the first and second cameras, such that the same y-coordinates of the upper body image and the lower image have epipolar corresponding relationship; according to a four-step phase-shifting algorithm, wrapped phases are obtained by means of computation with a phase-shift image subjected to epipolar rectification; a wrapped phase value at a pixel position $p^l(i,j)$ in the wrapped phase of the first camera is $w(i,j)$, the j-th row of the second camera is traversed to obtain a pixel position $p^r(ir,j)$ having a minimum phase difference in each wrapping cycle, and these pixel positions $p^r$ are used as corresponding candidate points of the pixel position $p^l$ of the first camera; pseudo random coding images of the first and second cameras are used as a target image and a to-be-matched image respectively, and considering a matching window with $p^l$ as a center on the human body image has a size of is $(2w+1)\times(2w+1)$, wherein a grey value of any pixel $p^l$ in the window is marked as $p^l(u^l,u^l)$, whereas a corresponding point of the candidate point $p^r$ on the to-be-matched image has a grey value of $p^r(u^r,u^r)$, and a normalized correlation measurement function $N_{CC}$ of the two windows is expressed by the following formula:

$$Ncc(I_l, I_r) = F(i, j, ir, j) =$$

$$\frac{\left\{\sum_{u=-w,}^{w}\sum_{v=-w}^{w}\left(p^l(i+u, j+v) - \overline{p^l}\right) * (p^r(ir+u, j+v) - \overline{p^r})\right\}^2}{\left\{\sum_{u=-w,}^{w}\sum_{v=-w}^{w}\left(p^l(i+u, j+v) - \overline{p^l}\right)\right\}^2 * \left\{\sum_{u=-w,}^{w}\sum_{v=-w}^{w}(p^r(ir+u, j+v) - \overline{p^r})\right\}^2}$$

wherein $\overline{p^l}$ and $\overline{p^r}$ respectively represents an average image grey, u and v respectively represent coordinates in a selected matching window, $p^l(i+u,j+v)$ represents a grey value at a pixel position $(i+u,j+v)$ in the window of the first camera, and $p^r(ir+u,j+v)$ represents a grey value at a pixel position $(ir+u,j+v)$ in the window of the second camera; upon epipolar rectification, each candidate point has the same y-coordinate j; a correlation measurement function is obtained by traversing all the candidate points (ir,j) of the second camera and the correlated values of a position (i,j) of the first camera, wherein only the corresponding point has a higher correlation value, and pixel-level corresponding points of the first and second cameras are obtained from the candidate points by defining a threshold; after the pixel-level points are obtained, a corresponding relationship of subpixels is obtained according to the wrapped phase differences of the first and second cameras, and three-dimensional geometric depth data is reconstructed in combination with pre-calibrated internal parameters and structural parameters of the first and second cameras.

6. The human body three-dimensional imaging system according to claim 5, wherein each camera of the three-dimensional sensor in each of the control base stations collects the human body image, performs depth computation for the collected human body image, and controls the (i+1)-th camera to collect a human body image while performing depth computation for a human body image collected by the i-th camera.

7. The human body three-dimensional imaging system according to claim 5, wherein the host controls the control base stations to transform the three-dimensional geometric depth data from their respective local coordinate systems to a global coordinate system according to the following formula:

$$\begin{cases} X_{w,1} = R_1^{-1} \cdot X_1 - R_1^{-1} \cdot T_1 \\ \ldots \\ X_{w,i} = R_i^{-1} \cdot X_i - R_i^{-1} \cdot T_i \\ \ldots \\ X_{w,10} = R_{10}^{-1} \cdot X_{10} - R_{10}^{-1} \cdot T_{10} \end{cases}$$

wherein $X_i$ represents the coordinates of a three-dimensional point in a local coordinate system of the i-th three-dimensional sensor, $R_i$ and $T_i$ represent a transformation matrix from the local coordinate system of the i-th three-dimensional sensor to a global coordinate system, $X_{wi}$ represents the coordinates of the point $X_i$ that is transformed to the global coordinate system, which is obtained through transformation of the calibrated result $r^i, t^i (i=1, 2, 3 \ldots 10)$; and the host comprises a calibrating module, wherein the calibrating module is configured to: perform central positioning and decoding for the mark points in the target image, and acquire a corresponding relationship between images from different view angles, and image coordinates according to different coding values of the coding points; to acquire image coordinates $\hat{m}_{ij}(K,\theta,r_i,t_i;X_j)$ of the global coordinates $X_j$ of each of the different codes at a shooting view angle i by means of bundle adjustment, and to optimize an error of the re-projection, as represented by the formula $$\min \text{cost}(K, \theta, X_j) = \sum_{i=1}^{N} \sum_{i=1}^{M} \left\{\|\hat{m}_{ij} - \tilde{m}_{ij}(K, \theta, r_i, t_i, X_j)\|^2\right\};$$

wherein $(K,\theta)$ represents an internal structural parameter of the camera, and $$K = \begin{bmatrix} f & \alpha & u_0 \\ 0 & f & v_0 \\ 0 & 0 & 1 \end{bmatrix},$$

$\{f, u_0, v_0, \alpha\}$ respectively representing a focal distance, a primary point x-coordinate, a primary point y-coordinate and a tilt factor, and $\theta = \{k_1, k_2, k_3, p_1, p_2\}$, $(k_1, k_2, k_3)$ representing lens radial distortion coefficients, and $(p_1, p_2)$ representing lens tangential distortion coefficients; M represents the number of mark points; N represents the number of images; $(r_i, t_i)$ represents a shooting gesture; and $\hat{m}_{ij}$ represents coordinates of a circle center image; thereafter, the corrected three-dimensional target that is placed into the measurement space is controlled to rotate for multiple times, and an image of the three-dimensional target is collected by the control base station upon each rotation; and with respect to a binocular node i, use a structural parameter of a binocular sensor and an external parameter of the node as parameter vectors to be optimized, and construct an optimized target function as represented by the formula $$\text{cost}(\tau_i) = \sum_{t=1}^{N} \sum_{s=1}^{M} \left\{ \left\| \hat{m}_l^{st} - \bar{m}_l^{st}(K_l^i, \theta_l^i, r_s^i, t_s^i; X_w^t) \right\|^2 + \left\| \hat{m}_r^{st} - \bar{m}_r^{st}(K_r^i, \theta_r^i, r^i, t^i, r_s^i, t_s^i; X_w^t) \right\|^2 \right\};$$

wherein subscript s represents the s-th shooting gesture of the system, t represents the t-th mark point in the target, $X_w^t$ represents the coordinates of the t-th mark point in the global coordinate system, $\tau_i = \{K_l^i, \theta_l^i, K_r^i, \theta_r^i, r^i, t^i, r_s^i, t_s^i\}$ represents a to-be-optimized parameter vector of the sensor node i, $\{K_l^i, \theta_l^i\}$ and $\{K_r^i, \theta_r^i\}$ respectively represent an internal parameter and a distortion of the first and second cameras of the sensor i, $\hat{m}_l^{st}$ and $\hat{m}_r^{st}$ represent image coordinates of reference points in the first and second cameras, $r^i, t^i$ represents a transformation relationship of the first and second cameras of the sensor i, $r_s^i, t_s^i$ represents an external parameter of the s-th shooting gesture, and $\hat{m}_l^{st}(\bullet)$ and $\hat{m}_r^{st}(\bullet)$ represent coordinates of the re-projected image; and to implement optimization estimation for the system parameters by using a minimum target function to obtain the structural parameter $r_s^i, t_s^i$ and the internal parameters $\{K_l^i, \theta_l^i\}$ and $\{K_r^i, \theta_r^i\}$ of the node for deep reconstruction of the sensor i, wherein $r^i, t^i$ represents a transformation relationship between the sensor i and the global coordinate system.

8. The human body three-dimensional imaging system according to claim 5, wherein the control center is one of the control base stations.

9. A method for calibrating multiple control base stations in the three-dimensional imaging system as defined in claim 5, comprising the following steps:

step A01: constructing a three-dimensional reference target with suitable size and attaching the coding marks on it for simultaneous calibrating all sensors; shooting the three-dimensional reference target from multiple different view angles by means of a high-resolution digital camera to obtain target images; wherein the three-dimensional target is capable of covering the measurement space and is adhered with a plurality of coding mark points on the surface thereof, each mark point has a different coding strip as a unique identifier;

step A02: performing central positioning and decoding for the mark points in the target image, and acquiring a corresponding relationship between images from different view angles, and image coordinates according to different coding values of the coding points;

step A03: acquiring image coordinates $\hat{m}_{ij}(K, \theta, r_i, t_i; X_j)$ of the global coordinates $X_j$ of each of the different codes at a shooting view angle i by means of bundle adjustment, and optimizing an error of the re-projection, as represented by the following formula:

$$\min \text{cost}(K, \theta, X_j) = \sum_{i=1}^{N} \sum_{i=1}^{M} \left\{ \left\| \hat{m}_{ij} - \bar{m}_{ij}(K, \theta, r_i, t_i, X_j) \right\|^2 \right\}$$

wherein (K,θ) represents an internal structural parameter of the camera, and $$K = \begin{bmatrix} f & \alpha & u_0 \\ 0 & f & v_0 \\ 0 & 0 & 1 \end{bmatrix},$$

$\{f, u_0, v_0, a\}$ respectively representing a focal distance, a primary point x-coordinate, a primary point y-coordinate and a tilt factor, and $\theta = \{k_1, k_2, k_3, p_1, p_2\}$, $(k_1, k_2, k_3)$ representing lens radial distortion coefficients, and $(p_1, p_2)$ representing lens tangential distortion coefficients; M represents the number of mark points; N represents the number of images; $(r_i, t_i)$ represents a shooting gesture; and $\hat{m}_{ij}$ represents coordinates of a circle center image; as such the global coordinates $X_j$ of different coding points are obtained and target correct is implemented;

step A04: placing the corrected three-dimensional target into the measurement space, controlling the three-dimensional target to rotate for multiple times, and collecting an image of the three-dimensional target by the control base station upon each rotation; and with respect to a binocular node i, using a structural parameter of a binocular sensor and an external parameter of the node as parameter vectors to be optimized, and constructing an optimized target function as represented by the following formula:

$$\text{cost}(\tau_i) = \sum_{t=1}^{N} \sum_{s=1}^{M} \left\{ \left\| \hat{m}_l^{st} - \bar{m}_l^{st}(K_l^i, \theta_l^i, r_s^i, t_s^i; X_w^t) \right\|^2 + \left\| \hat{m}_r^{st} - \bar{m}_r^{st}(K_r^i, \theta_r^i, r^i, t^i, r_s^i, t_s^i; X_w^t) \right\|^2 \right\}$$

wherein subscript s represents the s-th shooting gesture of the system, t represents the t-th mark point in the target, $X_w^t$, represents the coordinates of the t-th mark point in the global coordinate system, $\tau_i = \{K_l^i, \theta_l^i, K_r^i, \theta_r^i, r^i, t^i r_s^i, t_s^i\}$ represents a to-be-optimized parameter vector of the sensor node i, $\{K_l^i, \theta_l^i\}$ and $\{K_r^i, \theta_r^i\}$ respectively represent an internal parameter and a distortion of the first and second cameras of the sensor i, $\hat{m}_l^{st}$ and $\hat{m}_r^{st}$ represent image coordinates of reference points in the first and second cameras, $r^i, t^i$ represents a transformation relationship of the first and second cameras, $r_s^i, t_s^i$ represents an external parameter of the s-th shooting gesture, and $\hat{m}_l^{st}(\bullet)$ and $\hat{m}_r^{st}(\bullet)$ represent coordinates of the re-projected image; and step A05: implementing optimization estimation for the system parameters by using a minimum target function to obtain the structural parameter $r_s^i, t_s^i$ and the internal parameters $\{K_l^i, \theta_l^i\}$ and $\{K_r^i, \theta_r^i\}$ of the node for deep reconstruction of the sensor i, wherein $r^i, t^i$ represents a transformation relationship between the sensor i and the global coordinate system.

* * * * *